(12) United States Patent
Seo et al.

(10) Patent No.: US 7,889,968 B2
(45) Date of Patent: Feb. 15, 2011

(54) RECORDING MEDIUM HAVING DATA STRUCTURE FOR MANAGING REPRODUCTION OF MULTIPLE REPRODUCTION PATH VIDEO DATA FOR AT LEAST A SEGMENT OF A TITLE RECORDED THEREON AND RECORDING AND REPRODUCING METHODS AND APPARATUSES

(75) Inventors: Kang Soo Seo, Kyunggi-do (KR); Eun Sil Hyun, Seoul (KR); Jea Yong Yoo, Seoul (KR); Sung Wan Park, Suwon-si (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1318 days.

(21) Appl. No.: 10/462,714

(22) Filed: Jun. 17, 2003

(65) Prior Publication Data
US 2004/0156621 A1 Aug. 12, 2004

(30) Foreign Application Priority Data
Jun. 24, 2002 (KR) ............... 10-2002-0035420

(51) Int. Cl.
H04N 5/91 (2006.01)
H04N 5/00 (2006.01)
(52) U.S. Cl. .................. 386/69; 386/125; 386/126
(58) Field of Classification Search ............ 386/69, 386/95, 112, 125, 126
See application file for complete search history.

(56) References Cited

U.S. PATENT DOCUMENTS

| | | | |
|---|---|---|---|
| 5,521,898 A | 5/1996 | Ogasawara | |
| 5,559,808 A | 9/1996 | Kostreski et al. | |
| 5,602,956 A | * 2/1997 | Suzuki et al. | ............. 386/68 |
| 5,651,010 A | 7/1997 | Kostreski et al. | |
| 5,729,549 A | 3/1998 | Kostreski et al. | |
| 5,732,185 A | 3/1998 | Hirayama et al. | |
| 5,742,569 A | 4/1998 | Yamamoto et al. | |

(Continued)

FOREIGN PATENT DOCUMENTS

CA    2377690    11/2001

(Continued)

OTHER PUBLICATIONS

Japanese Office Action dated Apr. 22, 2008.

(Continued)

*Primary Examiner*—Thai Tran
*Assistant Examiner*—Hung Q Dang
(74) *Attorney, Agent, or Firm*—Harness, Dickey & Pierce, P.L.C.

(57) ABSTRACT

The recording medium includes at least one data area storing video data for at least one segment of a title. The video data is recorded as video data packets and at least a portion of the video data packets associated with different reproduction paths for the segment are multiplexed. In one exemplary embodiment, the multiplexed video data packets are multiplexed on a video data packet basis. In another exemplary embodiment, the video data packets associated with each reproduction path for the segment are recorded as one or mores groups and the groups are multiplexed.

28 Claims, 8 Drawing Sheets

U.S. PATENT DOCUMENTS

| | | |
|---|---|---|
| 5,747,136 A | 5/1998 | Shono et al. |
| 5,771,334 A | 6/1998 | Yamauchi et al. |
| 5,784,528 A * | 7/1998 | Yamane et al. .............. 386/112 |
| 5,819,003 A | 10/1998 | Hirayama et al. |
| 5,835,493 A | 11/1998 | Magee et al. |
| 5,854,873 A | 12/1998 | Mori et al. |
| 5,870,523 A | 2/1999 | Kikuchi et al. |
| 5,877,817 A | 3/1999 | Moon |
| 5,884,004 A | 3/1999 | Sato et al. |
| 5,895,124 A | 4/1999 | Tsuga et al. |
| 5,909,257 A | 6/1999 | Ohishi et al. |
| 5,913,010 A | 6/1999 | Kaneshige et al. |
| 5,940,255 A | 8/1999 | Uwabo et al. |
| 5,949,792 A | 9/1999 | Yasuda et al. |
| 5,953,187 A | 9/1999 | Uwabo et al. |
| 5,987,126 A | 11/1999 | Okuyama et al. |
| 5,999,698 A | 12/1999 | Nakai et al. |
| 6,031,962 A | 2/2000 | Sawabe et al. |
| 6,035,095 A | 3/2000 | Kaneshige et al. |
| 6,064,796 A | 5/2000 | Nakamura et al. |
| 6,067,400 A | 5/2000 | Saeki et al. |
| 6,167,189 A | 12/2000 | Taira et al. |
| 6,181,870 B1 | 1/2001 | Okada et al. |
| 6,181,872 B1 | 1/2001 | Yamane et al. |
| 6,195,726 B1 | 2/2001 | Hogan |
| 6,219,488 B1 | 4/2001 | Mori et al. |
| 6,222,805 B1 | 4/2001 | Mori et al. |
| 6,285,825 B1 | 9/2001 | Miwa et al. |
| 6,321,027 B2 | 11/2001 | Honjo |
| 6,336,002 B1 | 1/2002 | Yamauchi et al. |
| 6,343,062 B1 | 1/2002 | Furukawa et al. |
| 6,351,442 B1 | 2/2002 | Tagawa et al. |
| 6,353,613 B1 | 3/2002 | Kubota et al. |
| 6,360,055 B1 | 3/2002 | Kaneshige et al. |
| 6,377,747 B1 | 4/2002 | Murase et al. |
| 6,385,388 B1 | 5/2002 | Lewis et al. |
| 6,385,389 B1 | 5/2002 | Maruyama et al. |
| 6,385,394 B1 | 5/2002 | Okada et al. |
| 6,385,398 B1 | 5/2002 | Matsumoto |
| 6,393,196 B1 | 5/2002 | Yamane et al. |
| 6,393,574 B1 | 5/2002 | Kashiwagi et al. |
| 6,415,101 B1 | 7/2002 | DeCarmo et al. |
| 6,424,797 B1 | 7/2002 | Murase et al. |
| 6,445,872 B1 | 9/2002 | Sano et al. |
| 6,470,140 B1 | 10/2002 | Sugimoto et al. |
| 6,470,460 B1 | 10/2002 | Kashiwagi et al. |
| 6,480,669 B1 | 11/2002 | Tsumagari et al. |
| 6,504,996 B1 | 1/2003 | Na et al. |
| 6,515,101 B1 | 2/2003 | Sheares |
| 6,546,195 B2 | 4/2003 | Kashiwagi et al. |
| 6,556,774 B2 | 4/2003 | Tsumagari et al. |
| 6,564,006 B1 | 5/2003 | Mori et al. |
| 6,567,608 B2 | 5/2003 | Mori et al. |
| 6,573,819 B1 | 6/2003 | Oshima et al. |
| 6,584,277 B2 | 6/2003 | Tsumagari et al. |
| 6,603,517 B1 | 8/2003 | Shen et al. |
| 6,618,396 B1 | 9/2003 | Kondo et al. |
| 6,654,543 B2 | 11/2003 | Ando et al. |
| 6,788,883 B1 | 9/2004 | Park et al. |
| 6,801,713 B1 | 10/2004 | Yagawa et al. |
| 6,901,078 B2 | 5/2005 | Morris |
| 6,904,227 B1 | 6/2005 | Yamamoto et al. |
| 7,024,102 B1 | 4/2006 | Inoshita et al. |
| 7,072,573 B2 | 7/2006 | Okada et al. |
| 7,106,946 B1 | 9/2006 | Kato |
| 7,124,303 B2 | 10/2006 | Candelore et al. |
| 7,236,687 B2 | 6/2007 | Kato et al. |
| 2001/0038745 A1 | 11/2001 | Sugimoto et al. |
| 2002/0044757 A1 | 4/2002 | Kawamura et al. |
| 2002/0097984 A1 | 7/2002 | Abecassis |
| 2002/0106196 A1 | 8/2002 | Yamauchi et al. |
| 2002/0126991 A1 | 9/2002 | Kawamura et al. |
| 2002/0131767 A1 | 9/2002 | Auwens et al. |
| 2002/0145702 A1 * | 10/2002 | Kato et al. ..................... 352/1 |
| 2002/0150383 A1 | 10/2002 | Kato et al. |
| 2002/0159368 A1 | 10/2002 | Noda et al. |
| 2002/0180803 A1 | 12/2002 | Kaplan et al. |
| 2002/0196365 A1 | 12/2002 | Cho et al. |
| 2002/0197059 A1 | 12/2002 | Cho et al. |
| 2003/0002194 A1 | 1/2003 | Andoh |
| 2003/0026597 A1 | 2/2003 | Cho et al. |
| 2003/0113096 A1 | 6/2003 | Taira et al. |
| 2003/0118327 A1 | 6/2003 | Um et al. |
| 2003/0123849 A1 | 7/2003 | Nallur et al. |
| 2003/0133509 A1 | 7/2003 | Yanagihara et al. |
| 2003/0161615 A1 | 8/2003 | Tsumagari et al. |
| 2003/0221055 A1 | 11/2003 | Okada |
| 2003/0235403 A1 * | 12/2003 | Seo et al. ..................... 386/95 |
| 2003/0235404 A1 * | 12/2003 | Seo et al. ..................... 386/95 |
| 2003/0235405 A1 * | 12/2003 | Seo et al. ..................... 386/95 |
| 2004/0001700 A1 | 1/2004 | Seo et al. |
| 2004/0068606 A1 | 4/2004 | Kim et al. |
| 2004/0086261 A1 | 5/2004 | Hanes |
| 2004/0156621 A1 | 8/2004 | Seo et al. |
| 2004/0179819 A1 * | 9/2004 | Cho et al. ..................... 386/69 |
| 2004/0179820 A1 | 9/2004 | Kashiwagi et al. |
| 2004/0179827 A1 * | 9/2004 | Cho et al. ................... 386/111 |
| 2004/0247290 A1 * | 12/2004 | Seo et al. ..................... 386/95 |
| 2004/0252975 A1 * | 12/2004 | Cho et al. ..................... 386/95 |
| 2005/0019007 A1 | 1/2005 | Kato et al. |
| 2005/0025453 A1 * | 2/2005 | Kato et al. ..................... 386/95 |
| 2005/0025461 A1 | 2/2005 | Kato et al. |
| 2005/0036763 A1 | 2/2005 | Kato et al. |
| 2006/0098936 A1 | 5/2006 | Ikeda et al. |
| 2006/0222340 A1 | 10/2006 | Yamauchi et al. |

FOREIGN PATENT DOCUMENTS

| | | |
|---|---|---|
| CN | 1134583 | 10/1996 |
| CN | 1150293 | 5/1997 |
| CN | 1197573 A | 10/1998 |
| CN | 1220458 | 6/1999 |
| CN | 1237852 A | 12/1999 |
| CN | 1251461 A | 4/2000 |
| EP | 0 689 206 A1 | 12/1995 |
| EP | 0723216 | 7/1996 |
| EP | 0737980 | 10/1996 |
| EP | 0788105 | 8/1997 |
| EP | 0798722 | 10/1997 |
| EP | 0814475 | 12/1997 |
| EP | 0836183 | 4/1998 |
| EP | 0836189 | 4/1998 |
| EP | 0847195 | 6/1998 |
| EP | 0847198 | 6/1998 |
| EP | 0873022 | 10/1998 |
| EP | 0875856 | 11/1998 |
| EP | 0896337 | 2/1999 |
| EP | 0903744 | 3/1999 |
| EP | 0917355 | 5/1999 |
| EP | 0918438 | 5/1999 |
| EP | 0920203 | 6/1999 |
| EP | 0940983 | 9/1999 |
| EP | 0 961 279 A1 | 12/1999 |
| EP | 1003338 A2 | 5/2000 |
| EP | 1 043 724 A1 | 10/2000 |
| EP | 1081885 | 3/2001 |
| EP | 1 120 789 | 8/2001 |
| EP | 1126454 | 8/2001 |
| EP | 1198132 | 4/2002 |
| EP | 1198133 | 4/2002 |
| EP | 1202568 | 5/2002 |
| EP | 1469677 | 10/2004 |
| GB | 2351888 | 1/2001 |
| JP | 64-003781 | 1/1989 |

| | | |
|---|---|---|
| JP | 01-116819 | 5/1989 |
| JP | 08-088832 | 4/1996 |
| JP | 08-235833 | 9/1996 |
| JP | 8-511146 | 11/1996 |
| JP | 09-023403 | 1/1997 |
| JP | 09-251759 | 9/1997 |
| JP | 10-032780 | 2/1998 |
| JP | 10-040667 | 2/1998 |
| JP | 10-51737 | 2/1998 |
| JP | 10-051737 | 2/1998 |
| JP | 10-155138 | 6/1998 |
| JP | 10-255443 | 9/1998 |
| JP | 10-269698 | 10/1998 |
| JP | 10-271449 | 10/1998 |
| JP | 10-299698 | 11/1998 |
| JP | 10-340570 | 12/1998 |
| JP | 11-041563 | 2/1999 |
| JP | 11-066813 | 3/1999 |
| JP | 11-103444 | 4/1999 |
| JP | 11-134812 | 5/1999 |
| JP | 11-185463 | 7/1999 |
| JP | 01-003781 | 9/1999 |
| JP | 11-259976 | 9/1999 |
| JP | 11-341443 | 12/1999 |
| JP | 11-346341 | 12/1999 |
| JP | 2000-030414 | 1/2000 |
| JP | 2000-041066 | 2/2000 |
| JP | 2000-069437 | 3/2000 |
| JP | 2000-113602 | 4/2000 |
| JP | 2000-149514 | 5/2000 |
| JP | 2000-235779 | 8/2000 |
| JP | 2000-293938 | 10/2000 |
| JP | 2000-299836 | 10/2000 |
| JP | 2000-348442 | 12/2000 |
| JP | 2001-24973 | 1/2001 |
| JP | 2001-024985 | 1/2001 |
| JP | 2001-111944 | 1/2001 |
| JP | 2001-67802 | 3/2001 |
| JP | 2001-111929 | 4/2001 |
| JP | 2001-111960 | 4/2001 |
| JP | 2001-169246 | 6/2001 |
| JP | 2001-297535 | 10/2001 |
| JP | 2001-332006 | 11/2001 |
| JP | 2002-083486 | 3/2002 |
| JP | 2002-112179 | 4/2002 |
| JP | 2002-150685 | 5/2002 |
| JP | 2002-158971 | 5/2002 |
| JP | 2002-158972 | 5/2002 |
| JP | 2002-158974 | 5/2002 |
| JP | 2002-171472 | 6/2002 |
| JP | 2002-176623 | 6/2002 |
| JP | 2002-216460 | 8/2002 |
| JP | 2002-222581 | 8/2002 |
| JP | 2003-087744 | 3/2003 |
| JP | 2003-116100 | 4/2003 |
| JP | 2006-503400 | 1/2006 |
| KR | 10-1999-0022858 | 10/1997 |
| KR | 10-2000-0031861 | 6/2000 |
| KR | 10-2000-0055028 | 9/2000 |
| KR | 10-2000-0056179 | 9/2000 |
| KR | 10-2000-0065876 | 11/2000 |
| KR | 10-2001-0022702 | 3/2001 |
| KR | 10-0294884 | 4/2001 |
| KR | 10-2001-0098007 | 11/2001 |
| KR | 10-2001-0098101 | 11/2001 |
| KR | 10-2001-0107578 | 12/2001 |
| KR | 10-2002-0006674 | 1/2002 |
| KR | 10-2002-0020919 | 3/2002 |
| KR | 10-2002-0097454 | 12/2002 |
| KR | 10-2002-0097455 | 12/2002 |
| KR | 10-2004-0000290 | 1/2004 |
| KR | 10-2004-0030992 | 4/2004 |
| KR | 10-2004-0030994 | 4/2004 |
| KR | 10-2004-0030995 | 4/2004 |
| KR | 10-2004-0041581 | 5/2004 |
| TW | 391548 | 5/2000 |
| WO | WO 97/06531 | 2/1997 |
| WO | WO 97/13364 | 4/1997 |
| WO | WO 97/13365 | 4/1997 |
| WO | WO 97/13366 | 4/1997 |
| WO | WO 97/31374 | 8/1997 |
| WO | WO 97/39451 | 10/1997 |
| WO | WO 98/00952 | 1/1998 |
| WO | WO 99/08281 | 2/1999 |
| WO | WO 99/34601 | 7/1999 |
| WO | WO 00/02195 | 1/2000 |
| WO | WO 00/05883 | 2/2000 |
| WO | WO 00/42515 | 7/2000 |
| WO | WO 00/62295 | 10/2000 |
| WO | WO01/80239 A1 | 10/2001 |
| WO | WO 01/82604 | 11/2001 |
| WO | WO 01/82606 | 11/2001 |
| WO | WO 01/82609 | 11/2001 |
| WO | WO 01/82610 | 11/2001 |
| WO | WO 2004/001748 A1 | 12/2003 |
| WO | WO 2004/001750 | 12/2003 |
| WO | WO 2004/001753 | 12/2003 |
| WO | WO 2004/042723 | 5/2004 |
| WO | WO 2004/045206 | 5/2004 |
| WO | WO 2004-075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |

OTHER PUBLICATIONS

United States Office Action dated Jul. 9, 2008.
Japanese Office Action (dated May 7, 2008) for counterpart Japanese Patent Application No. 2004-517390.
Japanese Office Action (dated May 7, 2008) for counterpart Japanese Patent Application No. 2004-517368.
European Search Report (dated Mar. 31, 2008) for counterpart European Patent Application No. 03761863.4-2223.
European Search Report dated Aug. 13, 2008.
Japanese Office Action dated Nov. 4, 2008.
Australian Office Action dated Jul. 9, 2009.
Japanese Office Action dated Jul. 7, 2009.
Japanese Office Action dated Jul. 17, 2009 with English translation.
Office Action for corresponding U.S. Appl. No. 10/607,984 dated Oct. 15, 2009.
Search Report for corresponding European Application No. 03811549.9 dated Nov. 30, 2009.
Office Action for corresponding Australian Application No. 2003243049 dated Dec. 14, 2009.
Office Action for corresponding U.S. Appl. No. 10/702,557 dated Dec. 31, 2009.
Chinese Office Action dated Dec. 14, 2007.
Japanese Office Action dated Jan. 22, 2008.
European Search Report dated Dec. 28, 2007.
European Search Report dated Jan. 2, 2008.
United States Office Action dated Jan. 2, 2008.
United States Office Action dated Jan. 28, 2008.
European Search Report dated Oct. 8, 2009, application No. 03811959.
European Search Report dated Oct. 8, 2009, application No. 03733603.
European Search Report for counterpart European Patent Application No. EP03761845 dated Feb. 4, 2010.

* cited by examiner

RECORDING MEDIUM HAVING DATA STRUCTURE FOR MANAGING REPRODUCTION OF MULTIPLE REPRODUCTION PATH VIDEO DATA FOR AT LEAST A SEGMENT OF A TITLE RECORDED THEREON AND RECORDING AND REPRODUCING METHODS AND APPARATUSES

BACKGROUND OF THE INVENTION

1. Field of the Invention

The present invention relates to a recording medium having a data structure for managing reproduction of at least multiple reproduction path video data recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RW) is one example of these new optical disks.

Figure 1:
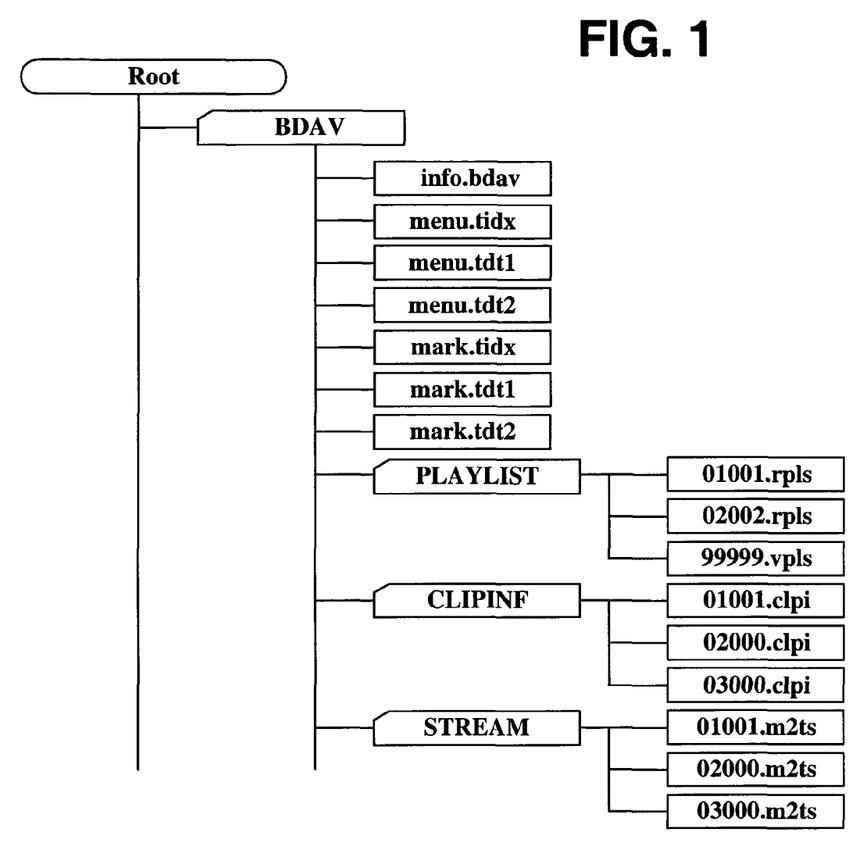
FIG. 1 illustrates the prior art file or data structure of a rewritable optical disk according to the Blu-ray Disc Rewritable (BD-RW) standard.

FIG. 1 illustrates the file structure of the BD-RW. The file structure or data structure provides for managing the reproduction of the video and audio data recorded on the BD-RW. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RW data structure and disk format as illustrated in FIG. 1 is well-known and readily available, only a brief overview of the file structure will be provided in this disclosure.

As alluded to above, the STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the files names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way. An effective data structure for managing reproduction of video and audio data recorded on the high-density read-only optical disk such as a BD-ROM is not yet available.

SUMMARY OF THE INVENTION

The recording medium according to the present invention has a data structure for managing reproduction of at least multiple reproduction path video data recorded thereon.

In one exemplary embodiment, at least one data area of the recording medium stores video data for at least one segment of a title. The video data is recorded as video data packets and at least a portion of the video data packets associated with different reproduction paths for the segment are multiplexed. In one exemplary embodiment, the multiplexed video data packets are multiplexed on a video data packet basis. In another exemplary embodiment, the video data packets associated with each reproduction path for the segment are recorded as one or mores groups and the groups are multiplexed.

In a further exemplary embodiment, a clip information directory area of the recording medium includes at least one entry point map associated with each reproduction path in the segment. Each entry point map identifies video data for the associated reproduction path and identifies a presentation time of the identified video data. In the exemplary embodiment, the entry point maps may be aligned in time. In another exemplary embodiment, the clip information directory area includes a single entry point map identifying at least the video data in the segment.

In a still further exemplary embodiment, a path management area of the recording medium stores path management information. The path management information identifies each reproduction path of at least the segment.

In yet another exemplary embodiment of the present invention, a title of video data including at least one multiple reproduction path segment may be recorded in a single clip file.

The present invention further provides apparatuses and methods for recording and reproducing the data structure according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE PREFERRED EMBODIMENTS

In order that the invention may be fully understood, preferred embodiments thereof will now be described with reference to the accompanying drawings.

Figure 2:
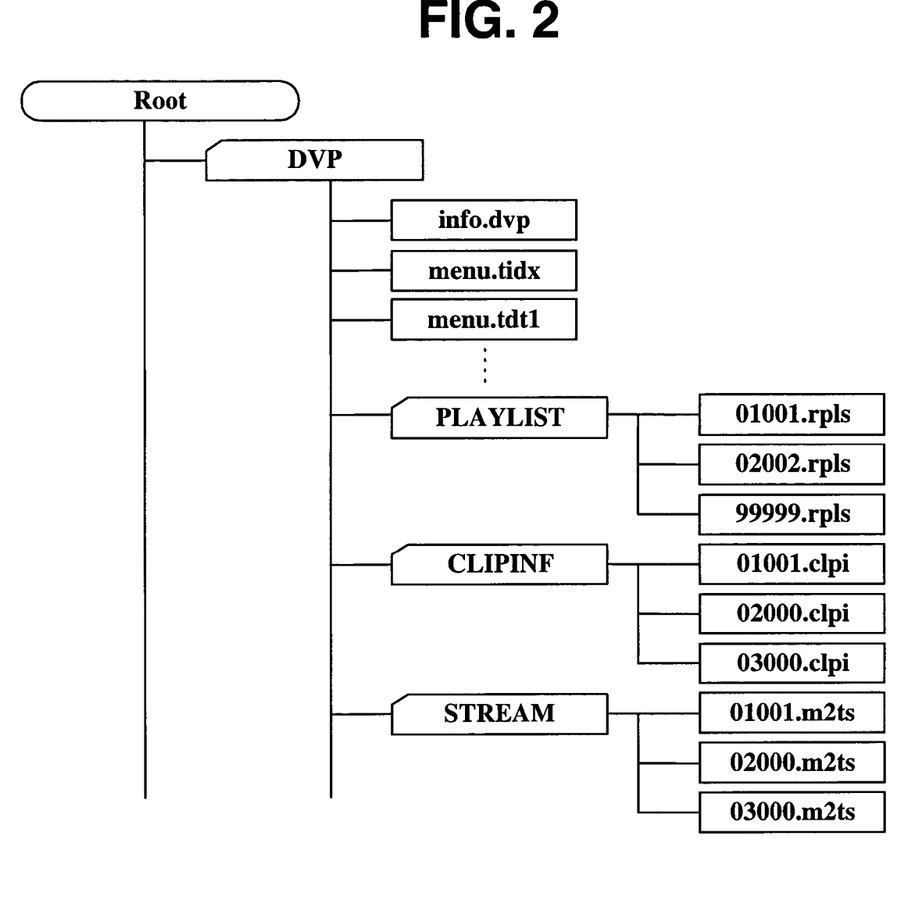
FIG. 2 illustrates an exemplary embodiment of a recording medium file or data structure according to the present invention.

A high-density optical disk, for example, a Blu-Ray ROM (BD-ROM) in accordance with the invention may have a file or data structure for managing reproduction of video and audio data as shown in FIG. 2. Many aspects of the data structure according to the present invention shown in FIG. 2 are similar to that of the BD-RW standard discussed with respect to FIG. 1. As such these aspects will not be described in great detail.

As shown in FIG. 2, the root directory contains at least one DVP directory. The DVP directory includes a general information file info.dvp, menu files menu.tidx, menu.tdt1 among others, a PLAYLIST directory in which playlist files (e.g., real (*.rpls) and virtual (*.vpls)) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID (s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.dvp file is a general information file that provides general information for managing the reproduction of the A/V streams recorded on the optical disk. More specifically, the info.dvp file includes, among other things, a table of playlists that identifies the file names of the playlists in the PLAYLIST directory.

Figure 3:
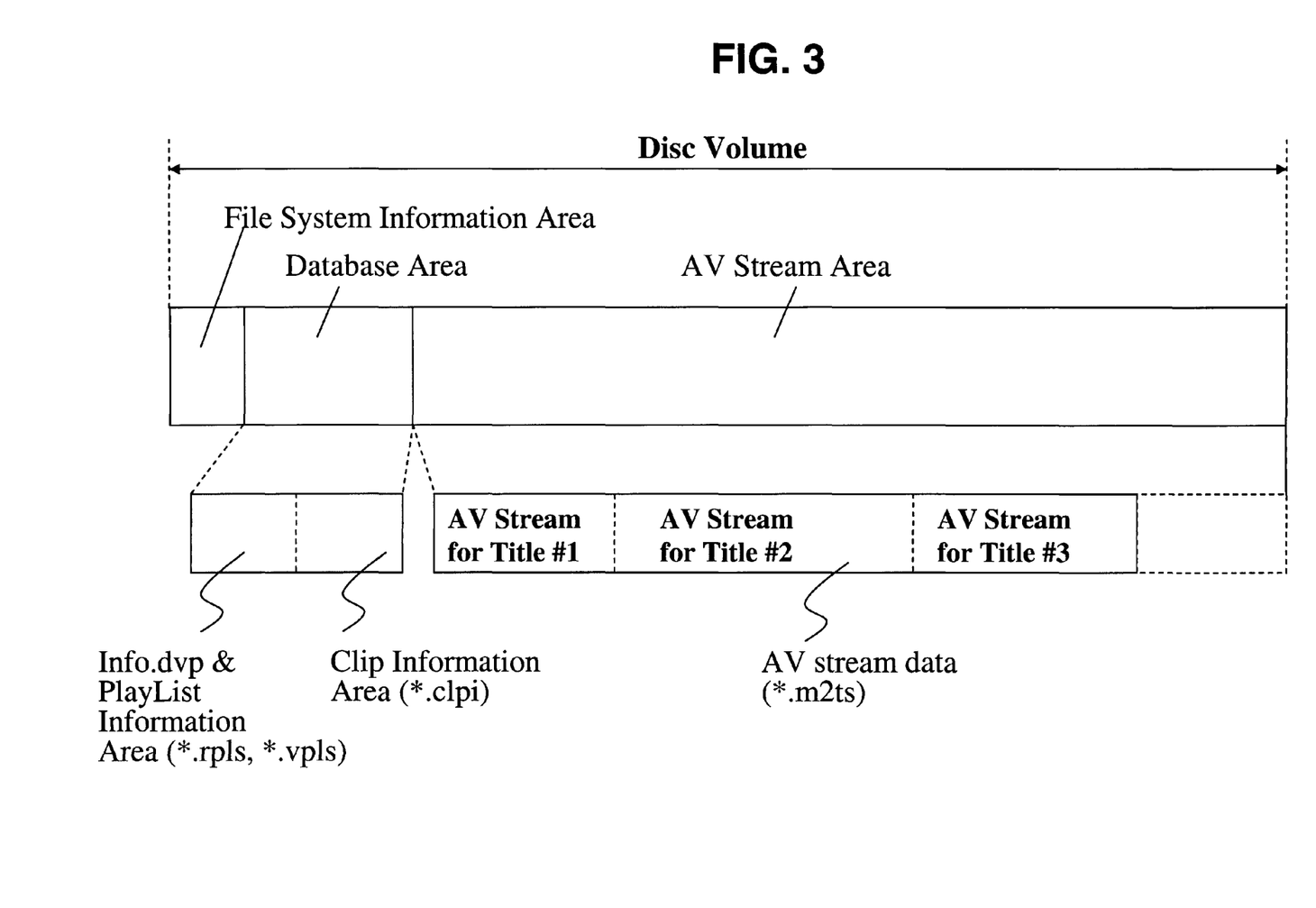
FIG. 3 illustrates an example of a recording medium having the data structure of FIG. 2 stored thereon.

In addition to illustrating the data structure of the recording medium according to an embodiment of the present invention, FIG. 2 represents the areas of the recording medium. For example, the general information file is recorded in one or more general information areas, the playlist directory is recorded in one or more playlist directory areas, each playlist in a playlist directory is recorded in one or more playlist areas of the recording medium, etc. FIG. 3 illustrates an example of a recording medium having the data structure of FIG. 2 stored thereon. As shown, the recording medium includes a file system information area, a data base area and an A/V stream area. The data base area includes a general information file and playlist information area and a clip information area. The general information file and playlist information area have the general information file recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version represents a different reproduction path, and the video data in these instances is referred to as multiple reproduction path video data. It will be appreciated that the above examples of multiple reproduction path video data are not limiting, and the present invention is applicable to any type or combination of types of multiple reproduction path video data. As will be described in detail below with respect to embodiments of the present invention, the data structures according to the present invention include path management information and/or navigation information for managing reproduction of multiple reproduction path video data recorded on the recording medium.

At least one clip file (*.m2ts) recorded on the BD-ROM may correspond to a title and the A/V stream recorded in the clip file is recorded in the form of MPEG2-formatted transport packets (TPs), wherein the TPs of a multiple reproduction path data stream contain packet IDs (PIDs) unique to each of the reproduction paths (e.g., different camera angles) for identifying the reproduction path.

The clip information file (*.clpi) pertaining to the clip file contains path management information for selectively playing the data stream of each reproduction path. The path management information is recorded as path sequence information containing path sequence numbers and video/audio PIDs for each reproduction path.

The clip information file also include search information for selectively playing the data stream of each reproduction path. For example, the clip information file includes at least one entry point (EP) map for selectively accessing transport packets having the packet ID unique to a particular reproduction path.

Figure 4A:
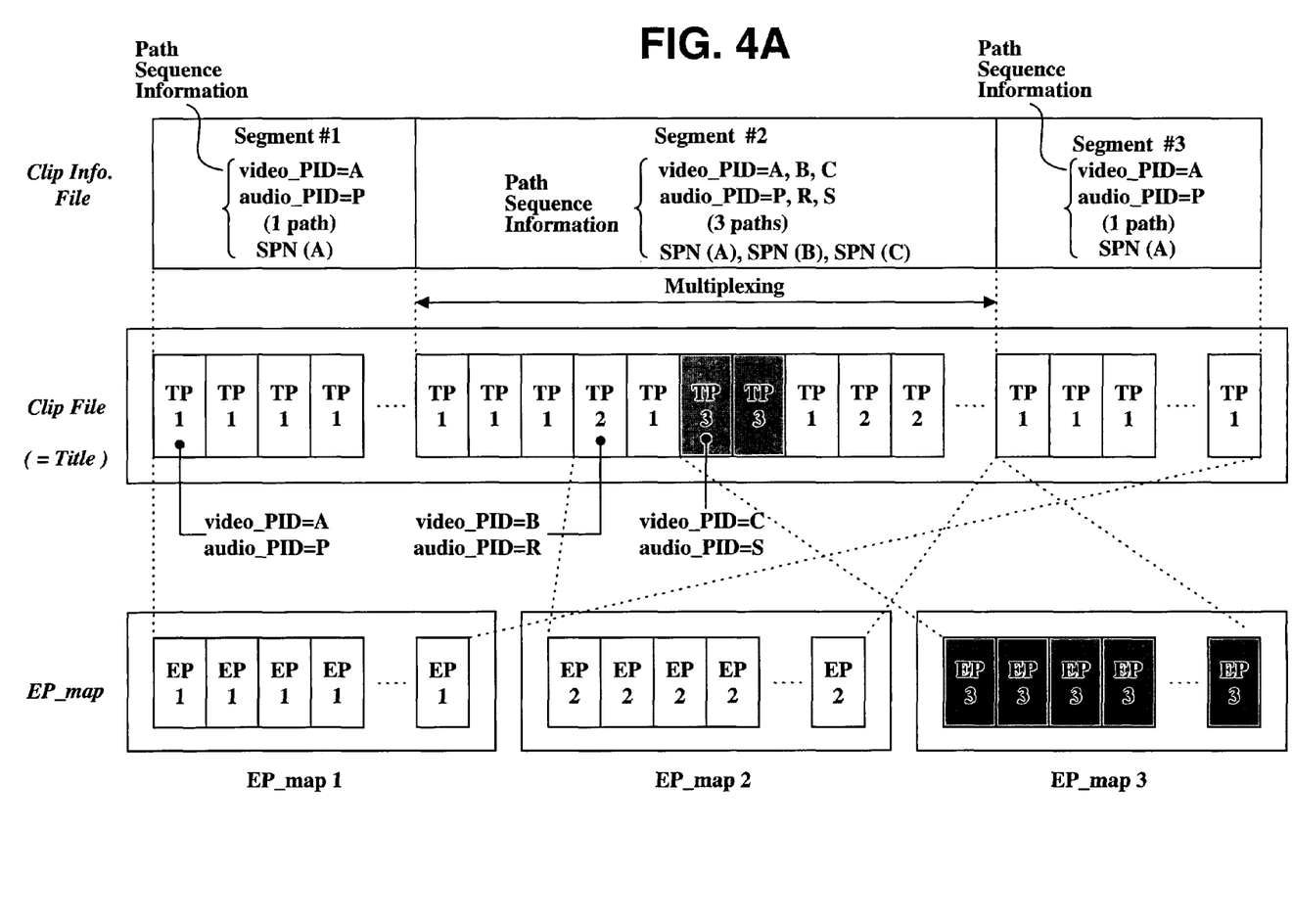
FIG. 4A illustrates a first detailed embodiment of the clip information file, disk data and EP maps for use in the data structure according to FIG. 2.

FIG. 4A illustrates a first detailed embodiment of the clip information file, disk data and EP maps for use in the data structure according to FIG. 2. As mentioned above, at least one clip file belonging to the file structure of the BD-ROM corresponds to a title and the A/V stream contained in the clip file is recorded as a series of MPEG2-formatted TPs.

A TP has a PID which is unique to each of the reproduction paths (e.g., camera angles) for identifying the reproduction path. As illustrated in FIG. 4A, a first recording segment (Segment #1) of a title in the clip file contains TPs (TP1) of a single-path A/V stream having the same video PID (Video_PID=A) and audio PID (Audio_PID=P) indicating the first reproduction path. The second recording segment (Segment #2) of the title in the clip file contains TPs having three distinct video PIDs (Video_PID=A, B, or C) an audio PIDs (Audio_PID=P, R, or S) indicating three distinct reproductions path-first through third reproduction paths. As shown, the TPs for the different reproduction paths are multiplexed in this recording segment.

The third recording segment (Segment #3) of the title in the clip file contains TPs (TP1) of a single-angle A/V stream and all the TPs (TP1) have the same video PID (Video_PID=A) and audio PID (Audio_PID=P) indicating the first reproduction path.

The path management information for playback control of the single-reproduction path and multi-reproduction path A/V stream for the three recording segments is recorded as path sequence information in a clip information file corresponding to the clip file. The path sequence information includes the segment number (also referred to as the sequence number) of the segment to which the path sequence information corresponds and the video/audio PIDs (Video_PIDs and Audio_PIDs), as shown in FIG. 4A.

In more detail, Path Sequence Information #1 corresponding to the first recording segment includes the information that 'Video_PID=A' and 'Audio_PID=P', which indicates the first reproduction path. Path Sequence Information #2 corresponding to the second recording segment includes the information that 'Video_PID=A,B,C' and 'Audio_PID=P,R,S', which indicates the first, the second, and the third reproduction paths. Likewise, Path Sequence Information #3 corresponding to the third recording segment includes the information that 'Video_PID=C' and 'Audio_PID=S', which indicates the third reproduction path.

Each of the path sequences may also include information on the number of reproduction paths in the corresponding recording segment and a source packet number (SPN) for the first transport packet in each reproduction path. For example, the Path Sequence Information #2 includes SPN(A), SPN(B) and SPN(C) where SPN(A) is the source packet number for the first source packet in the first reproduction path (i.e., Video_PID=A), SPN(B) is the source packet number for the first source packet in the second reproduction path (i.e., Video_PID=B) and SPN(C) is the source packet number for the first source packet in the third reproduction path (i.e., Video_PID=C).

The clip information file also stores search information for selectively accessing TPs of each reproduction path recorded in the first through third segments. For example, the clip information file includes entry point (EP) maps that map presentation time stamps (PTSs) to source packet numbers (SPNs).

An EP map may be created for each reproduction path in the clip file. In the example of FIG. 4A, three entry point maps (EP maps 1, 2, 3) corresponding to the first, second and third reproduction paths may be created.

Figure 4B:
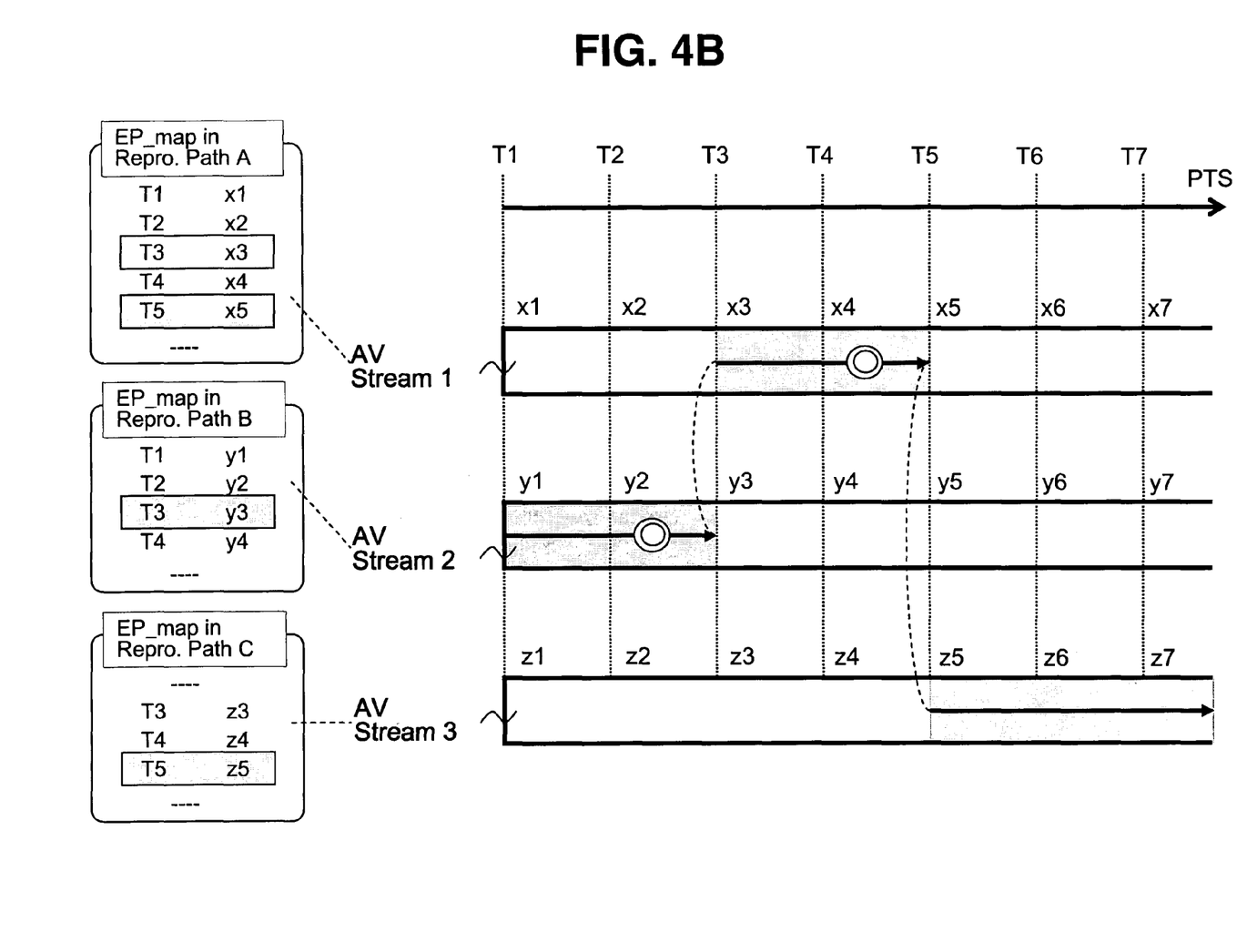
FIG. 4B illustrates the time alignment that exists between the EP maps for the AV streams of different reproduction paths.

FIG. 4B illustrates the time alignment that exists between the EP maps for the different reproduction paths. As discussed, an EP map maps the presentation time stamp information such as indicated in a playitem to a source packet. More particularly, the presentation time stamp is mapped to the address or identifier of the source packet. The address or identifier is the source packet number (SPN). FIG. 4B further shows the source packets by source packet number along the presentation time stamp axis for reproduction paths 1, 2, and 3. As shown, source packets in each of the EP maps 1, 2, and 3 have the same presentation time stamps. For example, source packet x1 from the first reproduction path A, source packet y1 from the second reproduction path B and source packet z1 from the third reproduction path C have the same presentation time stamp T1. As such, the EP maps 1, 2 and 3 are time-aligned. Because of this time-alignment, seamless reproduction of video data is possible even when the reproduction path is changed during reproduction. FIG. 4B illustrates changes in reproduction path by two concentric circles. As shown, if a user decides to change the reproduction path from second reproduction path B to first reproduction path A during reproduction of source packet y2, then after completing reproduction of source packet y2, source packet x3 is the next source packet reproduced. Similarly if a user decides to change reproduction path (e.g., change camera angle to view) from first reproduction path A to third reproduction path C during reproduction of source packet x4, then after completing reproduction of source packet x4, source packet z5 is reproduced. It will be understood that the source packet numbers given in the example above are merely exemplary.

Figure 5:
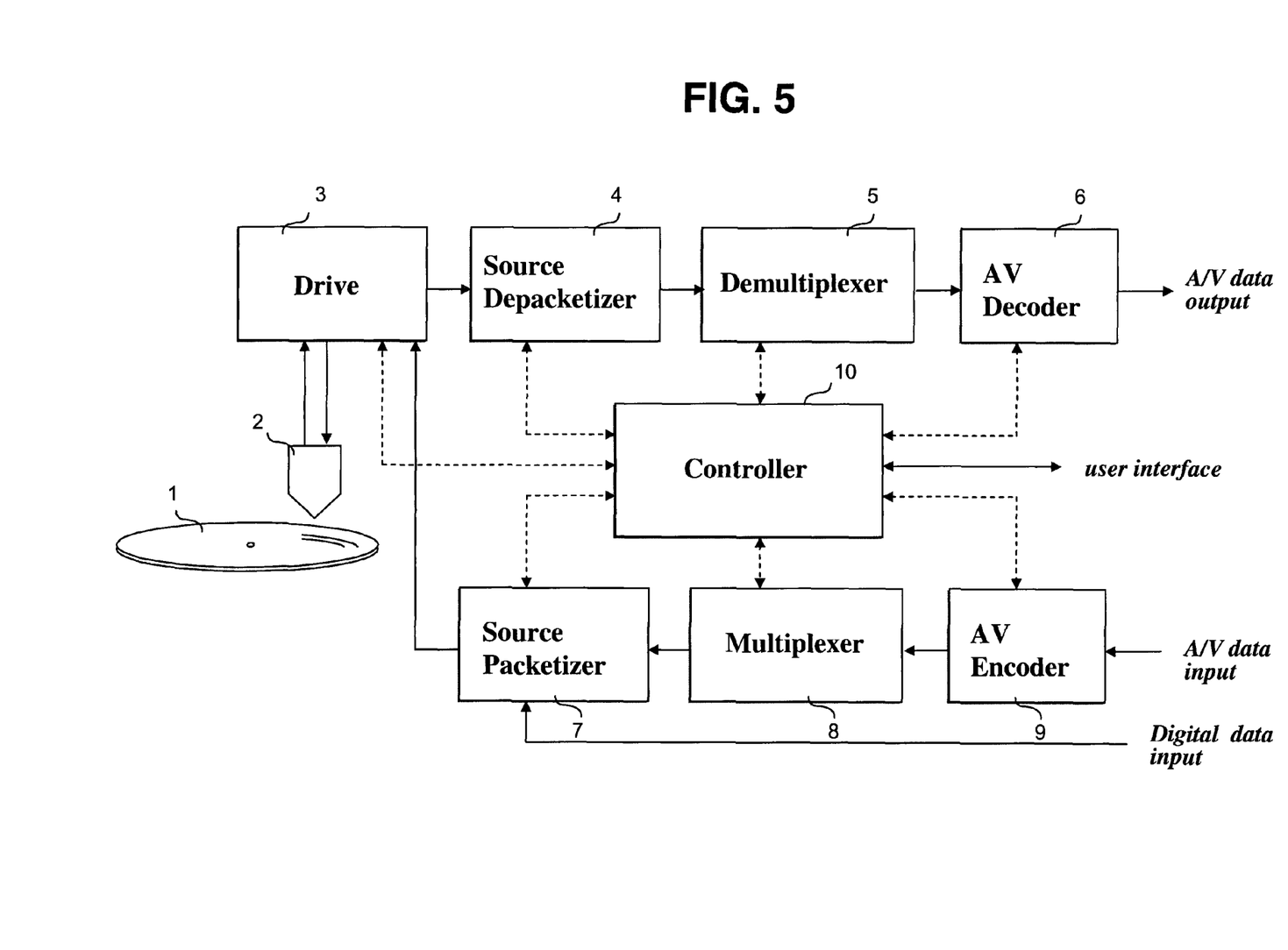
FIG. 5 illustrates a schematic diagram of an embodiment of an optical disk recording and reproduction apparatus of the present invention.

FIG. 5 illustrates a schematic diagram of an embodiment of an optical disk recording and reproducing apparatus according to the present invention. As shown, an AV encoder 9 receives and encodes audio and video data. The AV encoder 9 outputs the encoded audio and video data along with coding information and stream attribute information. A multiplexer 8 multiplexes the encoded audio and video data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 5, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the management information for managing reproduction of the audio/video data being recorded on the optical disk. For example, based on information received via the user interface (e.g., instruction set saved on disk, provided over an intranet or internet by a computer system, etc.) the controller 10 controls the drive 3 to record the data structure of FIGS. 2 and 4A-4B on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the audio/video source packets from the optical disk. For example, the user input may specify a path to reproduce. This user input may be specified, for example, via a menu based graphical user interface preprogrammed into the controller 10. Using the user input and the path management information reproduced from the optical disk, the controller 10 controls the reproduction of the specified path.

For instance; path management information in the form of the path sequence information in the clip information file may be reproduced and used to manage the reproduction of multiple reproduction path video data. Here, the PIDs in each path sequence information are examined to determine the number of reproduction paths. The user is then requested to select a path. The EP map corresponding to the selected reproduction path is used to reproduce the audio and video for the selected reproduction path. And, as discussed above, if the user changes the reproduction path during reproduction, a seamless change takes place by using the EP map of the new reproduction path that is aligned in time with the EP map of the old reproduction path.

The reproduced source packets are received by a source depacketizer 4 and converted into a data stream (e.g., an MPEG-2 transport packet stream). A demultiplexer 5 demultiplexes the data stream into encoded video and audio data. An AV decoder 6 decodes the encoded video and audio data to produce the original audio and video data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 5 has been described as a recording and reproducing apparatus, it will be understood that only a recording or only a reproducing apparatus may be provided using those portions of FIG. 5 providing the recording or reproducing function.

Figure 6:
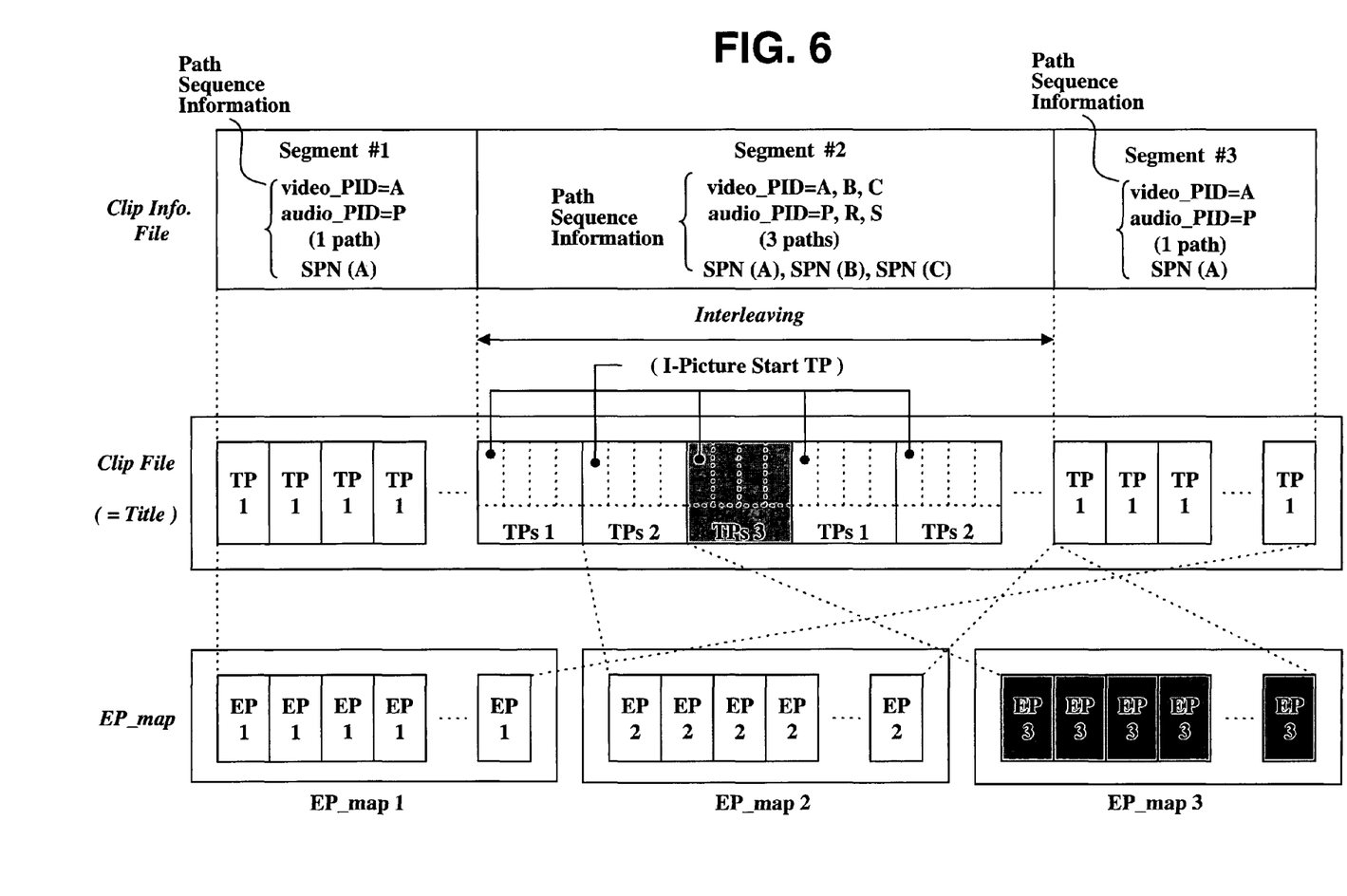
FIGS. 6 and 7 illustrate a second and third detailed embodiments of the clip information file, disk data and EP maps for use in the data structure according to FIG. 2.

FIG. 6 illustrates a second detailed embodiment of the clip information file, disk data and EP maps for use in the data structure according to FIG. 2. The embodiment of FIG. 6 is the same as the embodiment of FIGS. 4A-4B described above except for how the transport packets corresponding to multiple reproduction path recording segments are multiplexed (i.e., interleaved). Accordingly, for the sake of brevity, only the differences between the embodiments of FIG. 6 and FIG. 4A will be described.

As shown in FIG. 6, the transport packets (TP) for each reproduction path are recorded as one or more groups, and the groups are multiplexed. Also, each group includes at least one I-picture. As illustrated in FIG. 6, the first TP of each group of TPs is the first TP of an I-picture.

As will be readily apparent, the recording and reproducing apparatus of FIG. 5 may operate in the same manner with respect to the embodiment of FIG. 6 as was described above with respect to the embodiment of FIG. 4A-4B.

Figure 7:
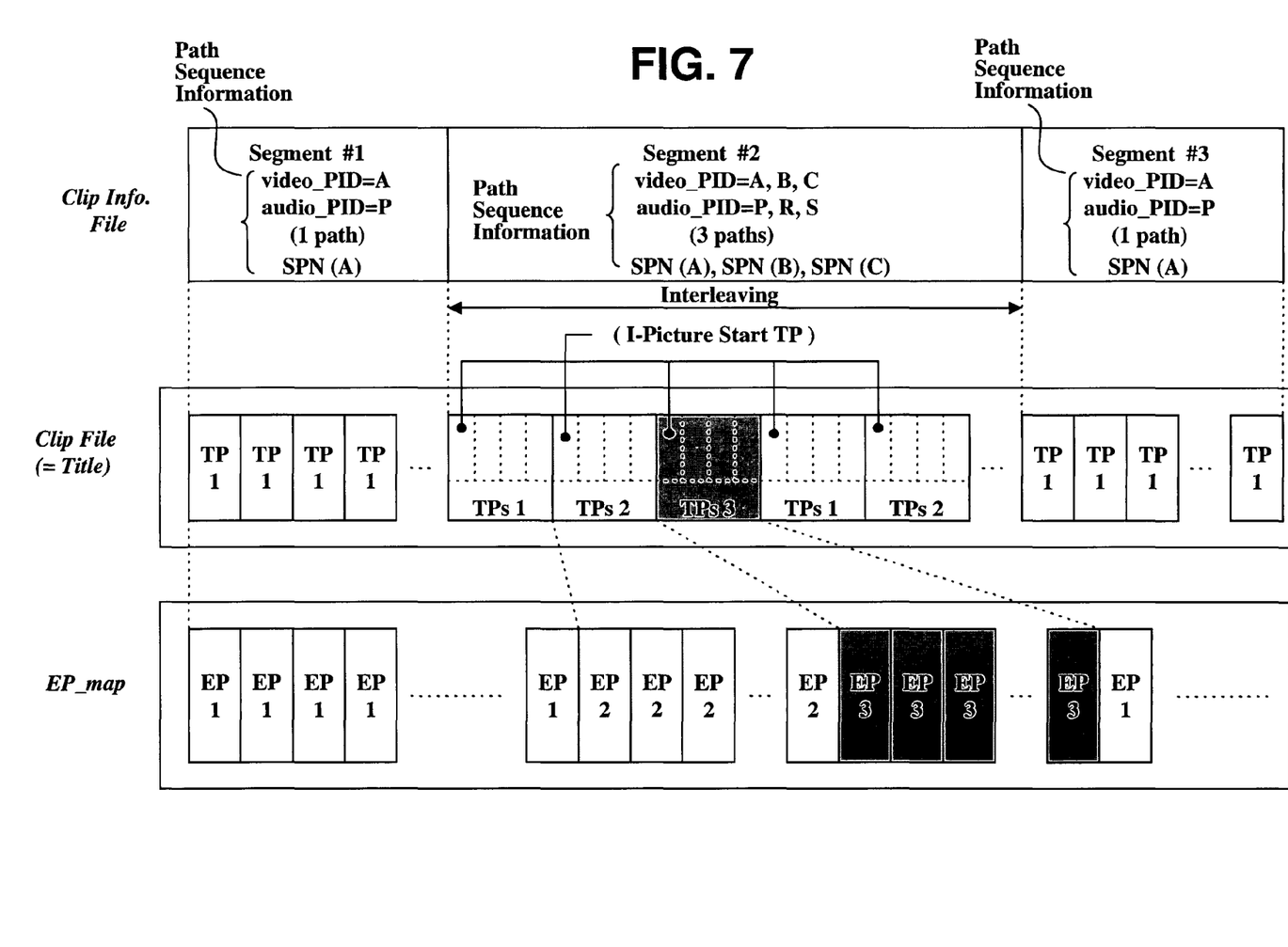

According to another embodiment, the entry point maps EP maps 1, 2, and 3 may be managed as a single entry point map as illustrated in FIG. 7. In this case, PTSs and SPNs of TPs of the three different reproduction paths are recorded in the entry point map by interleaving in the same order that the TPs of the three different reproduction paths are recorded.

FIG. 7 illustrates a third detailed embodiment of the clip information file, disk data and EP map for use in the data structure according to FIG. 2. The embodiment of FIG. 7 is the same as the embodiment of FIG. 6 described above except the instead of including an EP map for each reproduction path in a clip file, a single EP map is provided in the clip information file. Accordingly, for the sake of brevity, only the differences between the embodiments of FIG. 7 and FIG. 6 will be described.

As shown in FIG. 7, the EP map information recorded in the clip information file is managed as a single EP map. Here, the PTSs mapping to SPNs of the TPs of the different reproduction paths are contained in a single map.

As will be readily apparent, the recording and reproducing apparatus of FIG. 5 may operate in the same manner with respect to the embodiment of FIG. 7 as was described above with respect to FIGS. 4A and 4B. However, it will be appreciated that other methods of reproduction are also possible and the present invention is not limited to this one example.

As will be appreciated from the forgoing disclosure, the present invention provides a recording medium having a file or data structure that permits managing the reproduction of video data on a multiple reproduction path basis. Accordingly, the present invention provides a greater level of flexibility in the reproduction of video data than previously available.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. As another example, the video and audio PIDs of TPs of each reproduction path may differ according to the segment in which the TPs are recorded. It is intended that all such modifications and variations fall within the spirit and scope of the invention.

What is claimed is:

1. A non-transitory computer-readable recording medium having a data structure for managing reproduction of at least video data having multiple reproduction paths recorded thereon, comprising:
   at least one clip file storing the video data for a title, the title including a first segment for a single reproduction path and a second segment for multiple reproduction paths, wherein the video data are recorded as video data packets, and the video data packets for the second segment are interleaved; and
   at least one management information including reproduction path information corresponding to the segments and at least one entry point map,
   wherein the reproduction path information includes information indicating the number of the reproduction paths of the second segment and an identifier identifying a reproduction path ID of the multiple reproduction paths of the second segment, and each reproduction path of the multiple reproduction paths is associated with one of the at least one clip files of the multiple reproduction paths, each of the multiple reproduction paths being associated with a different entry point map, the entry point map mapping a presentation time stamp to an address for a corresponding entry point of the video data, the entry point map including information identifying where changing a reproduction path among the multiple reproduction paths is permitted, the information identifying an entry point at which entry to an associated reproduction path from another reproduction path is permitted,
   wherein at least one playlist is included in the reproduction path information, the playlist is a collection of a plurality of playitems, each playitem including an in-time and an out-time for identifying a playing interval of the video data, and the multiple reproduction paths of the second segment are associated with one playitem, a file name extension of the clip file is different from a file name extension of the management information.

2. The non-transitory computer-readable recording medium of claim 1, wherein the entry point maps are aligned in-time.

3. The non-transitory computer-readable recording medium of claim 1, wherein
   each video data packet has a packet number that differentiates one video data packet from another; and
   the at least one entry point map identifies the video data for the associated reproduction path by identifying the packet numbers of the video data packets.

4. The non-transitory computer-readable recording medium of claim 1, wherein
   the video data packets associated with one or more reproduction paths for the segment are recorded as one or more groups and the groups are multiplexed.

5. The non-transitory computer-readable recording medium of claim 4, wherein each group of the video data packets represents at least an intra-coded picture.

6. The non-transitory computer-readable recording medium of claim 5, wherein a first video data packet in each group is a start of an intra-coded picture.

7. The non-transitory computer-readable recording medium of claim 1, wherein the multiple reproduction paths of the video data for the segment are multiple camera angles of the video data for the segment.

8. The non-transitory computer-readable recording medium of claim 1, wherein the management information comprises at least one clip information file and at least one playlist file.

9. The non-transitory computer-readable recording medium of claim 8, wherein the playlist file is configured to store at least one playitem having the number of the reproduction paths.

10. The non-transitory computer-readable recording medium of claim 1, wherein the entry point maps are configured so that when a user switches from a first reproduction path associated with a first video data packet to a second reproduction path associated with a second video data packet, the second data packet is not reproduced until the reproduction of the first video data packet is complete.

11. A method of recording a data structure for managing reproduction of at least video data having multiple reproduction paths on a recording medium, comprising:
   recording at least one clip file storing the video data for a title in a data area such that the video data is recorded as video data packets, the title including a first segment for a single reproduction path and a second segment for multiple reproduction paths, the video data packets for the second segment being interleaved; and
   generating management information, the management information including reproduction path information corresponding to the segments and at least one entry point map, wherein the reproduction path information includes information indicating the number of the reproduction paths of the second segment and an identifier identifying a reproduction path ID of the multiple reproduction paths of the second segment, and each reproduction path of the multiple reproduction paths is associated with one of the at least one clip file of the multiple reproduction paths, each of the multiple reproduction paths being associated with a different entry point map such that the entry point map maps a presentation time stamp to an address for a corresponding entry point of the video data, wherein the entry point map includes information identifying where changing a reproduction path among the multiple reproduction paths is permitted, the information identifying an entry point at which entry to an associated reproduction path from another reproduction path is permitted, and wherein at least one playlist is included in the reproduction path information, the playlist is a collection of a plurality of playitems, each playitem including an in-time and an out-time for identifying a playing interval of the video data, and the multiple reproduction paths of the second segment are associated with one playitem, a file name extension of the clip file is different from a file name extension of the management information.

12. The method of claim 11, wherein the entry point maps are aligned in-time.

13. A method of claim 11, wherein each video data packet has a packet number that differentiates one video data packet from another; and the entry point map identifies the video data for the associated reproduction path by identifying the packet numbers of the video data packets.

14. The method of claim 11, wherein the management information comprises at least one clip information file and at least one playlist file, the playlist file including at least one playitem having the number of the reproduction paths.

15. A method of reproducing a data structure for managing reproduction of at least video data having multiple reproduction paths recorded on a recording medium, comprising:

reading at least one management information, the management information including reproduction path information and at least one entry point map from the recording medium, the reproduction path information corresponding to a title in the recording medium, the title including a first segment for a single reproduction path and a second segment for multiple reproduction paths, the reproduction path information including information indicating the number of reproduction paths of the second segment and an identifier identifying a reproduction path ID of the multiple reproduction paths of the second segment, and the entry point map being configured to map a presentation time stamp to an address for a corresponding entry point of the video data, the video data being stored in at least one clip file, wherein the entry point map includes information identifying where changing a reproduction path among the multiple reproduction paths is permitted, the information identifying an entry point at which entry to an associated reproduction path from another reproduction path is permitted, and each reproduction path of the multiple reproduction paths are associated with one of the at least one clip file of the multiple reproduction paths, each of the multiple reproduction paths being associated with a different entry point map, wherein at least one playlist is included in the reproduction path information, the playlist is a collection of a plurality of playitems, each playitem including an in-time and an out-time for identifying a playing interval of the video data, and the multiple reproduction paths of the second segment are associated with one playitem; and reproducing the video data for the segments of a title, the video data being recorded as video data packets, and the video data packets for the second segment being interleaved, a file name extension of the clip file is different from a file name extension of the management information.

16. The method of claim 15, wherein the entry point maps are aligned in-time.

17. The method of claim 15, wherein each video data packet has a packet number that differentiates one video data packet from another; and the entry point map identifies the video data for the associated reproduction OCRZone path by identifying the packet numbers of the video data packets.

18. The method of claim 15, wherein the management information comprises at least one clip information file and at least one playlist file, the playlist file including at least one playitem having the number of the reproduction paths.

19. An apparatus for recording a data structure for managing reproduction of at least video data having multiple reproduction paths on a recording medium, comprising:

a recording unit being configured to record data on the recording medium;

an encoder being configured to encode at least video data having the multiple reproduction paths; and a controller, operably coupled to the recording unit, being configured to control the recording unit to record at least one clip file including the encoded video data having the multiple reproduction paths on the recording medium such that the video data for a title, the title including a first segment for a single reproduction path and a second segment for multiple reproduction paths, is recorded on the recording medium, the video data being recorded as video data packets, and the video data packets for the second segment being interleaved, and the controller being configured to control the recording unit to record at least one management information including reproduction path information corresponding to the segments and at least one entry point map, wherein the reproduction path information includes information indicating the number of the reproduction paths of the second segment and an identifier identifying a reproduction path ID of the multiple reproduction paths of the second segment, and each reproduction path of the multiple reproduction paths is associated with each one of the at least one clip file of the multiple reproduction paths, each of the multiple reproduction paths being associated with a different entry point map, the entry point map being configured to map a presentation time stamp to an address for a corresponding entry point of the video data, the entry point map including information identifying where changing a reproduction path among the multiple reproduction paths is permitted, the information identifying an entry point at which entry to an associated reproduction path from another reproduction path is permitted, wherein at least one playlist is included in the reproduction path information, the playlist is a collection of a plurality of playitems, each playitem including an in-time and an out-time for identifying a playing interval of the video data, and the multiple reproduction paths of the second segment are associated with one playitem, a file name extension of the clip file is different from a file name extension of the management information.

20. The apparatus of claim 19, wherein the entry point maps are aligned in-time.

21. The apparatus of claim 19, wherein each video data packet has a packet number that differentiates one video data packet from another; and
 each entry point map identifies the video data for the associated reproduction path by identifying the packet numbers of the video data packets.

22. The apparatus of claim 19, wherein the management information comprises at least one clip information file and at least one playlist file, the playlist file including at least one playitem having the number of the reproduction paths.

23. The apparatus of claim 19, wherein the recording unit includes a pickup unit to record the clip file and the management information on the recording medium.

24. An apparatus for reproducing a data structure for managing reproduction of at least video data having multiple reproduction paths recorded on a recording medium, comprising:
 a reproducing unit being configured to reproduce data recorded on the recording medium;
 a controller, operably coupled to the reproducing unit, being configured to control the reproducing unit to reproduce at least one clip file including the video data for a title from a data area, the title including a first segment for a single reproduction path and a second segment for multiple reproduction paths, the video data being recorded as video data packets, and the video data packets for the second segment being interleaved, and the controller being configured to control the reproducing unit to read at least one management information from the recording medium, the management information including reproduction path information and at least one entry point map, the reproduction path information corresponding to the segments of the title in the recording medium, the reproduction path information including information indicating the number of the reproduction paths of the second segments, and an identifier identifying a reproduction path ID of the multiple reproduction paths of the second segment, each reproduction path of the multiple reproduction paths being associated with one of the at least one clip file of the multiple reproduction paths, each of the multiple reproduction paths being associated with a different entry point map, the entry point map being configured to map a presentation time stamp to an address for a corresponding entry point of the video data,
 wherein the entry point map includes information identifying where changing a reproduction path among the multiple reproduction paths is permitted, the information identifying an entry point at which entry to an associated reproduction path from another reproduction path is permitted, and
 wherein at least one playlist is included in the reproduction path information, the playlist is a collection of a plurality of playitems, each playitem including an in-time and an out-time for identifying a playing interval of the video data, and the multiple reproduction paths of the second segment are associated with one playitem, a file name extension of the clip file is different from a file name extension of the management information.

25. The apparatus of claim 24, wherein the entry point maps are aligned in-time.

26. The apparatus of claim 24, wherein each video data packet has a packet number that differentiates one video data packet from another; and
 the entry point map identifies the video data for the associated reproduction path by identifying the packet numbers of the video data packets.

27. The apparatus of claim 24, wherein the management information comprises at least one clip information file and at least one playlist file, the playlist file including at least one playitem having the number of the reproduction paths.

28. The apparatus of claim 24, wherein the reproducing unit includes a pickup unit to reproduce the clip file and the management information.

* * * * *

UNITED STATES PATENT AND TRADEMARK OFFICE
CERTIFICATE OF CORRECTION

| | | |
|---|---|---|
| PATENT NO. | : 7,889,968 B2 | Page 1 of 1 |
| APPLICATION NO. | : 10/462714 | |
| DATED | : February 15, 2011 | |
| INVENTOR(S) | : Kang Soo Seo et al. | |

It is certified that error appears in the above-identified patent and that said Letters Patent is hereby corrected as shown below:

IN THE CLAIMS:

In claim 24 at column 13, lines 39 to 40, "information indicating the number of the reproduction paths of the second segments" should be changed to --information indicating the number of the reproduction paths of the second segment--

Signed and Sealed this
Nineteenth Day of April, 2011

David J. Kappos
*Director of the United States Patent and Trademark Office*